April 27, 1965
J. E. WOODS
3,180,149
THERMAL RESPONSIVE UNIT
Filed March 2, 1961
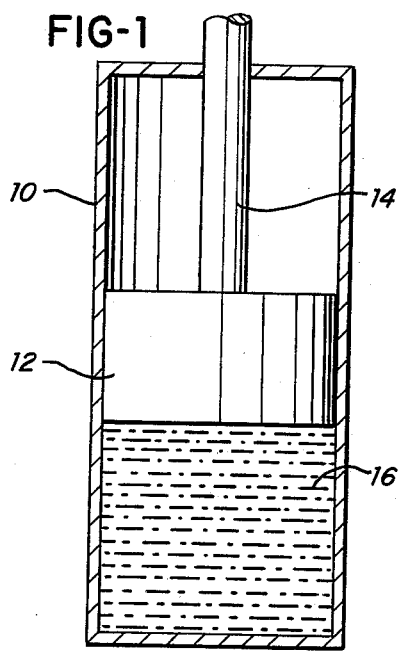
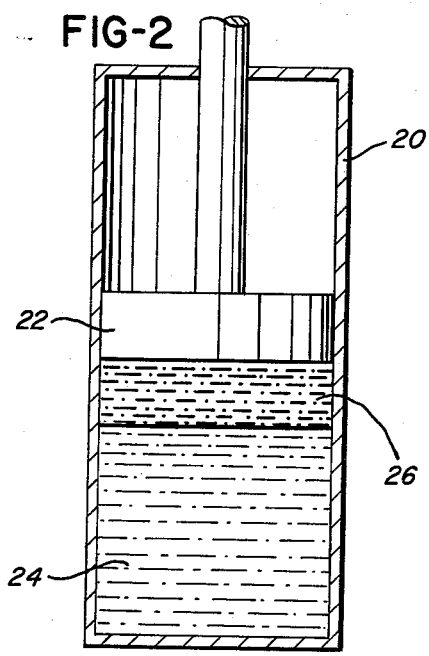
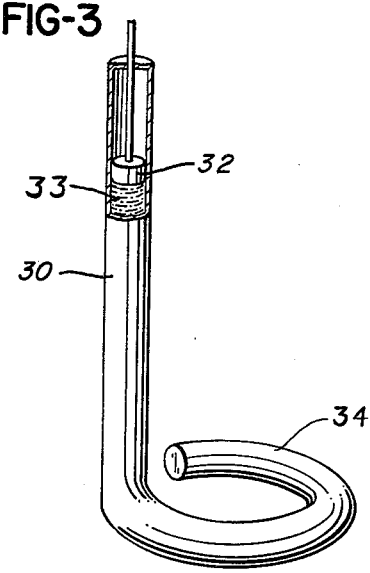
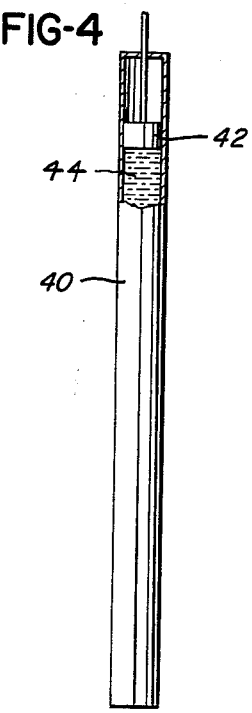
INVENTOR.
JOHN E. WOODS
BY William R Jacox
ATTORNEY

United States Patent Office 3,180,149
Patented Apr. 27, 1965

3,180,149
THERMAL RESPONSIVE UNIT
John E. Woods, Cohasset, Mass., assignor to Standard-Thomson Corporation, Waltham, Mass., a corporation of Delaware
Filed Mar. 2, 1961, Ser. No. 92,810
4 Claims. (Cl. 73—358)

This invention relates to thermal units.

Numerous types of thermal responsive actuators have been produced. It is preferable to have a thermally responsive actuator which is pressure insensitive so that it operates without being affected by external pressures applied thereto. Such actuators ordinarily have a rigid container or cup which has a quantity of thermal responsive expansive material therein. The usual prior art actuator has within the container a petroleum wax which, when heated to its melting or fusion temperature expands to a considerable degree while changing from a solid to a liquid. The container also has actuator means which is moved in a direction therefrom by expansion of the material therewithin.

In such devices it has been necessary to provide sealing means to prevent the escape of the expansive material from the container as the expansive material, during the expansion attending its transition through its fusion temperature, exerts very high pressures upon the container and upon actuator means extending therefrom. Since, at the point the greatest expansive force is exerted, the material is substantially a liquid, many problems have arisen in providing an effective sealing means for the expansive material.

Many types of elastomeric or pliable sealing means have been devised. Frictional forces in such devices have, by necessity, been excessive. It has been found to be very difficult to provide sealing means which does not objectionably affect the operation of the actuator and which can be long lived throughout a multiplicity of operations. When an elastomeric or pliable sealing means has been used, a cavity is sometimes formed in the expansive material as the expansive material contracts in volume during cooling thereof and withdraws from the sealing member. This formation of a cavity is objectionable due to the fact that the cavity is a vacuum and tends to draw fluids into the actuator from exterior thereof.

Furthermore, an elaborate sealing means has necessarily increased the physical size of an actuator considerably beyond the size required to contain the expansive material. Also, in any prior art valve devices provided with an actuator having elastomeric sealing means, failure of the sealing means has usually resulted in failure of the valve mechanism in a closed position. This is objectionable because such a valve mechanism does not "fail safe."

Thus, it is an object of this invention to provide a thermal responsive, pressure insensitive, actuator which does not require the conventional sealing means.

Another object of this invention is to provide an actuator which when used in most valve mechanisms permits the mechanism to fail safe.

Another object of this invention is to provide a thermal responsive actuator which is capable of producing high values of forces in consideration of its physical size.

Another object of this invention is to provide such an actuator which is capable of producing long stroke action.

Another object of this invention is to provide an actuator, the container of which may be any of a multiplicity of sizes and shapes, thereby making available a wide range of actuator responses, such as greater linear and/or volumetric movements.

Another object of this invention is to provide such an actuator which can be produced for use at low temperatures, intermediate temperatures, and at high temperatures.

Another object of this invention is to provide such an actuator which can be applied to many types, sizes and shapes of devices and to many types of uses.

Another object of this invention is to provide an actuator unit which may be of any size or shape necessary to obtain the maximum heat transfer conditions.

Other objects and advantages reside in the construction of parts, the combination thereof, the method of manufacture, and the mode of operation, as will become more apparent from the following description.

To achieve these and such other objects and advantages as will be apparent from a reading of the following disclosure, the present invention encompasses a pellet or slug or mass of a force transmission material which is capable of undergoing a substantial volumetric expansion in response to a relatively small thermal change without, however, changing from a solid to a completely liquid state. The present invention also provides means for controlling that temperature of the force transmission material at which there is a high coefficient of expansion. The high coefficient of expansion of the material is completely separate and apart from the melting or fusion temperature thereof which, in fact, according to the present invention is never actually reached in the operation of the thermal unit. In practice, the particular force transmission material employed in any thermally operative mechanism, such as in an actuator for a thermostatic valve, in most cases may be so modified that the temperature at which it achieves its highest coefficient of thermal expansion will substantially coincide with the operating temperature; i.e., the temperature at which it is desired to open or to close the valve. Since, however, this temperature of highest coefficient of thermal expansion is not dependent upon or attended by the changing of the force transmission material from a solid to a liquid, elaborate sealing means for confining a pressurized liquid are not necessary.

It has been found that materials capable of the above-described desirable responses to thermal change are the polyolefin hydrocarbons such as polyethylene or polypropylene having fusion temperatures above the desired operating temperature of the mechanism. Such materials would normally be regarded as unsuitable for use in thermal responsive mechanisms because they do not have a temperature at which there is a substantial increase in the coefficient of thermal expansion at a transition point. However, the fact that they will remain solid or semi-solid at relatively high operating temperatures such as 350° Fahrenheit or above, does enable them to be used in thermostatic units without any requirement for elaborate sealing means, etc., such as are required to confine and control an expanding or pressurized liquid. Thus, where the operating temperatures to be ultimately encountered are relatively high and where the length of the thermally expansive slug or pellet is not restricted by environmental considerations, a rod or pencil composed exclusively of the olefinic material may be employed, the movement or expansion thereof necessary to actuate the control mechanism being the result of a relatively small expansion per unit of length under the additive or multiplying influence of a multiplicity of such units.

More unique features and advantages of the present invention, however, reside in those modifications thereof wherein lower operating temperatures are to be encountered in the order of from 0° F. to 350° F., and where the length of the thermostatic fill or pellet is limited of necessity or by desire. In such cases it has been found that a relatively low-melting material such as the conventionally employed petroleum waxes may be admixed with the polyolefin. The resulting material will be such that, even though the heating of the mixture carries its temperature past the normal fusion or transition point of the wax, the wax, whether or not it in fact becomes a liquid at such point, does not separate from the polyolefin. The result is that the entire substance remains as a solid or semi-solid and the difficulties attending the handling of a liquid are thereby avoided. Thus, the present invention provides a thermostatic "fill material" in which the wax-like additives are properly selected as to melting temperature and quantity for admixing with a polyolefin, to obtain a high coefficient of thermal expansion at any desired operating temperature while keeping the beneficial effects of a solid thermostatic material.

In the drawing:

FIGURE 1 is a sectional view showing an actuator of this invention.

FIGURE 2 is a sectional view showing a modification of an actuator of this invention.

FIGURE 3 is an elevational view with parts broken away and shown in section of a modification in the shape of a container member of an actuator of this invention.

FIGURE 4 is an elevational view with parts broken away and shown in section of a differently shaped container member of an actuator of this invention.

Referring to the drawing in detail, a container 10 has therewithin a piston 12 which is provided with a piston rod 14. The piston 12 is slidably engageable with the internal wall of the container 10. Between the piston 12 and the lower end of the container 10 is a quantity of thermal responsive expansible-contractible force transmission material 16.

It has been found that there are various thermoplastic materials which can be used in the container 10 as the expansive material 16 for generation of pressure upon the piston 12. A thermoplastic material is selected which remains in a substantially solid state over the operating range of the actuator. Therefore, the material 16 does not flow or leak between the piston 12 and the wall of the container 10 during expansion of the material 16. Thus, it is not necessary to use a conventional sealing member between the piston and the expansive material.

An example of such a thermoplastic material which can be used as the material 16 is polyethylene. A slug or mass or pellet of polyethylene having a diameter substantially equal to the inside diameter of the container 10 is placed therein. The polyethylene expands under increased temperatures and forces movement of the piston 12 but the polyethylene does not reach a fluid state. Thus, no sealing member between the polyethylene and the piston 12 is required. It has also been found that the material 16 can consist of polypropylene in place of polyethylene or the polypropylene may be mixed with the polyethylene. Any suitable polyolefin which has good expansion characteristics over a given temperature range without becoming fluid serves as the material 16. Preferably, the polyolefin selected, in addition to its good expansion characteristics, has sufficient lubricity so that the material 16 readily slidably moves against the inner wall of the container 10 as the material 16 expands while remaining in solid form.

In order to provide increased expansion of the expansive material 16 over a given temperature range, a wax, such as a petroleum or mineral wax or the like, is mixed with the polyolefin. As stated, the polyolefin may be polyethylene or polypropylene or any other suitable polyolefin. Due to the fact that the polyethylene or polypropylene has a much higher melting temperature than the wax, the mixing operation is preferably carried out as follows: The polyethylene or polypropylene is granulated. The particles obtained are mixed with a wax which melts at the desired operating temperature of the actuator. The wax may be in a solid or in a liquid state when the mixing operation is carried out. The mixing is preferably performed in a mill such as a rubber mill. The rolls of the mill are usually heated during the milling operation. It has been found that by such a milling process the wax may be absorbed into the polyolefin. The mixture is formed into an elongate cylinder having a diameter substantially equal to the inner diameter of the container 10. Then the elongate cylinder is cut to suitable length to form pellets.

When this mixture is used as the material 16 in the container 10, there is a high coefficient of expansion at substantially the melting temperature of the wax, but the wax does not separate from the solid polyolefin at the operating temperature of the actuator. Due to the fact that there is no separation of the wax from the polyolefin, a conventional elastomeric or pliable sealing member between the expansive material 16 and the piston 12 is not required.

In order to provide a force transmission material which will more greatly expand over a given temperature range for a given volume thereof, the volumetric proportion of the wax to the polyolefin may be increased. It has been found, however, that in the use of force transmission materials having greater than approximately 50% by volume of wax, there is a tendency for the mixture to become much less viscous. Under such conditions, the arrangement of FIGURE 2 is employed. A container 20 has a piston 22 therewithin. At the lower portion of the container 20 is a thermal expansive material 24. The material 24 comprises primarily a wax which melts at the desired operating temperature of the actuator. The wax is mixed with a quantity of solid polyethylene or other polyolefin in a manner discussed above. Intermediate the material 24 and the piston 22 is a layer 26 of polyolefin having no wax admixed therewith. The layer 26 fits snugly against the walls of the container 20 but has good lubricity for sliding movement with expansion of the material 24. The layer 26 prevents leakage from the container 20 of wax and polyolefin mixtures of low viscosity, herein referred to as the material 24. Thus, the expansive material 24 causes a considerable movement of the piston 22 in consideration of the physical size of the container 20.

A further refinement of the present invention is based upon the fact that the olefin material, as in either of FIGURES 1 and 2, acts, in a sense, as a sealer for the petroleum wax that is admixed therewith. It might be said that the polyolefin, as a continuous phase in the mixture such as 16 in FIGURE 1, surrounds or encapsulates each of the small droplets or atomized particles of the petroleum wax, thereby preventing their liquification from substantially influencing the solidity of the entire mixture.

In the embodiment shown in FIGURE 2, as stated above, it may happen that the proportion of the wax in the polyolefin of the material 24 is greater than 50%. Thus, as the entire material 24 is heated to or toward the operating temperature, the wax and polyolefin mixture assume a viscosity which is more difficult to contain. To prevent this mixture from presenting a sealing problem at the piston 22, a plug or layer 26 of polyolefin which may or may not have wax therein is positioned adjacent the piston 22. Any polyolefin or similar type of material, including Teflon or the like, may be used as the sealing plug 26. The first requirement for such a plug is that it be a thermoplastic as distinguished from an elastomer. Secondly, such a plug 26 must have good lubricity so that it readily slidably moves while remaining in engagement with the internal wall of the container. This polyolefin plug such as 26 may be formed integrally with the material 24 or may, at least at the assembly stage, be a separate disc or layer of polyolefin.

Due to the fact that no elastomeric or pliable sealing member or body is required, an actuator of this invention can be of small physical size in consideration of its work producing capacities.

Also, due to the fact that a conventional sealing member is not required, a piston, such as the piston 12, or 22, or 32, or 42, may be maintained in direct pressure contact with the expansive material or plug during cooling of the expansive material. Thus, no cavity within the expansive material can be formed during the cooling thereof.

Furthermore, due to the fact that an elastomeric sealing member or no sealing member whatsoever is required in an actuator of this invention, the rigid container member may be of any desired shape for physical or thermal purposes.

The container may be an elongate member of small cross section, as illustrated by the container 40 in FIGURE 4. A piston 42 is slidably movable within the container 40. All that is necessary in such a container is to provide a sufficient volume of expansive material 44, of the type described above, to exert the necessary forces upon the piston 42 over the length of stroke desired.

A container 30 of FIGURE 3 is an illustration of an irregular shape of a container of an actuator of this invention. The actuator includes expansive material 33, of the type described above, and a piston 32. A portion of the container 30 is formed into any suitable shape such as a loop 34, thereby providing a greater heat transfer surface at some position otherwise remote from the piston 32. The shape of a container may be any shape or configuration necessary or desirable to provide sufficient thermal transfer operative movement without having an objectionable physical size. For example, the shape of the container of an actuator of this invention may be such as to permit the actuator to be readily placed in or associated with a valve mechanism or other mechanism for operation thereof without increasing the physical size thereof.

Also, it is to be understood that a thermal unit of this invention provides "fail safe" features due to the fact that as expansive forces increase there is no sealing member to fail. Thus, all expansive forces are directly applied toward movement of an actuator means such as a piston or the like.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A thermal unit comprising container means, actuator means within the container means and extending therefrom, thermostatic fill material within the container and operable upon the actuator means, a portion of the fill material being adjacent the actuator means, the thermostatic fill material including a polyolefinic material which is solid over a given temperature range, a second material, the second material having a fusion temperature within said given temperature range and being mixed with said polyolefinic material, the portion of the fill material which is adjacent the actuator means having a smaller volumetric proportion of said second material than does the remainder of the fill material.

2. A thermal unit according to claim 1 wherein the portion of the fill adjacent the actuator means is substantially free of said second material, at least at the lower temperatures within said given temperature range.

3. A thermal unit according to claim 2 wherein the portion of the fill adjacent the actuator means is separate from and in uniform contact with the remainder of said fill, at least at the lower temperatures within said given temperature range.

4. A thermal unit comprising container means, actuator means within the container means and extending therefrom, thermostatic fill material within the container and operable upon the actuator means, a portion of the fill material being adjacent the actuator means, the thermostatic fill material including a polyolefinic material which is solid over a given temperature range, a second material, the second material having a fusion temperature within said given temperature range and being mixed with said polyolefinic material, the portion of the fill material which is adjacent the actuator means having a smaller volumetric proportion of said second material than does the remainder of the fill material, the portion of the fill material which is adjacent the actuator means being in the form of a layer which is in engagement with the remainder of the fill material.

References Cited by the Examiner

UNITED STATES PATENTS

| | | | |
|---|---|---|---|
| 2,259,846 | 10/41 | Vernet et al. | 73—363 |
| 2,548,941 | 4/51 | Brown | 73—363 |
| 2,598,351 | 5/52 | Carter | 73—363 |
| 2,835,634 | 5/58 | Vernet | 73—368.3 |
| 2,873,633 | 2/59 | May | 73—358 |
| 2,906,123 | 9/59 | Vernet | 73—368.3 |
| 3,001,401 | 9/61 | Vernet et al. | 73—368.3 |
| 3,016,691 | 1/62 | Asakawa et al. | 73—368.3 |

OTHER REFERENCES

Lange, N. A.: Handbook of Chemistry, 4th edition, Sundusky, Ohio, Handbook Publishers Co., 1941, pages 472–473.

ISAAC LISANN, *Primary Examiner.*